United States Patent [19]
Meronek

[11] 3,837,363
[45] Sept. 24, 1974

[54] FLOW CONTROL DEVICE
[76] Inventor: Petro W. Meronek, R.R. No. 1, Osoyoos, British Columbia, Canada
[22] Filed: Dec. 20, 1972
[21] Appl. No.: 316,668

[52] U.S. Cl. ................................ 138/45, 239/534
[51] Int. Cl. ........................................ F16d 1/00
[58] Field of Search .......... 138/45, 46; 239/534, 535

[56] References Cited
UNITED STATES PATENTS

| | | | |
|---|---|---|---|
| 2,667,900 | 2/1954 | Cantalupo............................ | 138/45 |
| 2,716,427 | 8/1955 | Cantalupo............................ | 138/45 |
| 2,764,183 | 9/1956 | Gollehon ............................. | 138/45 |
| 2,781,058 | 2/1957 | Warhus................................. | 138/45 |
| 3,006,378 | 10/1961 | Erickson et al....................... | 138/46 |
| 3,077,903 | 2/1963 | Honsinger............................ | 138/45 |

*Primary Examiner*—Charles A. Ruehl
*Attorney, Agent, or Firm*—Burns, Doane, Swecker & Mathis

[57] ABSTRACT

An apparatus to maintain a substantially constant rate of fluid flow through a conduit in which the fluid is subject to variations in static head pressure. A regulating control element responsive to the pressure variations is mounted within a hollow insert casing to form a flow control device in a self-contained capsule form which is insertable within the conduit.

5 Claims, 2 Drawing Figures

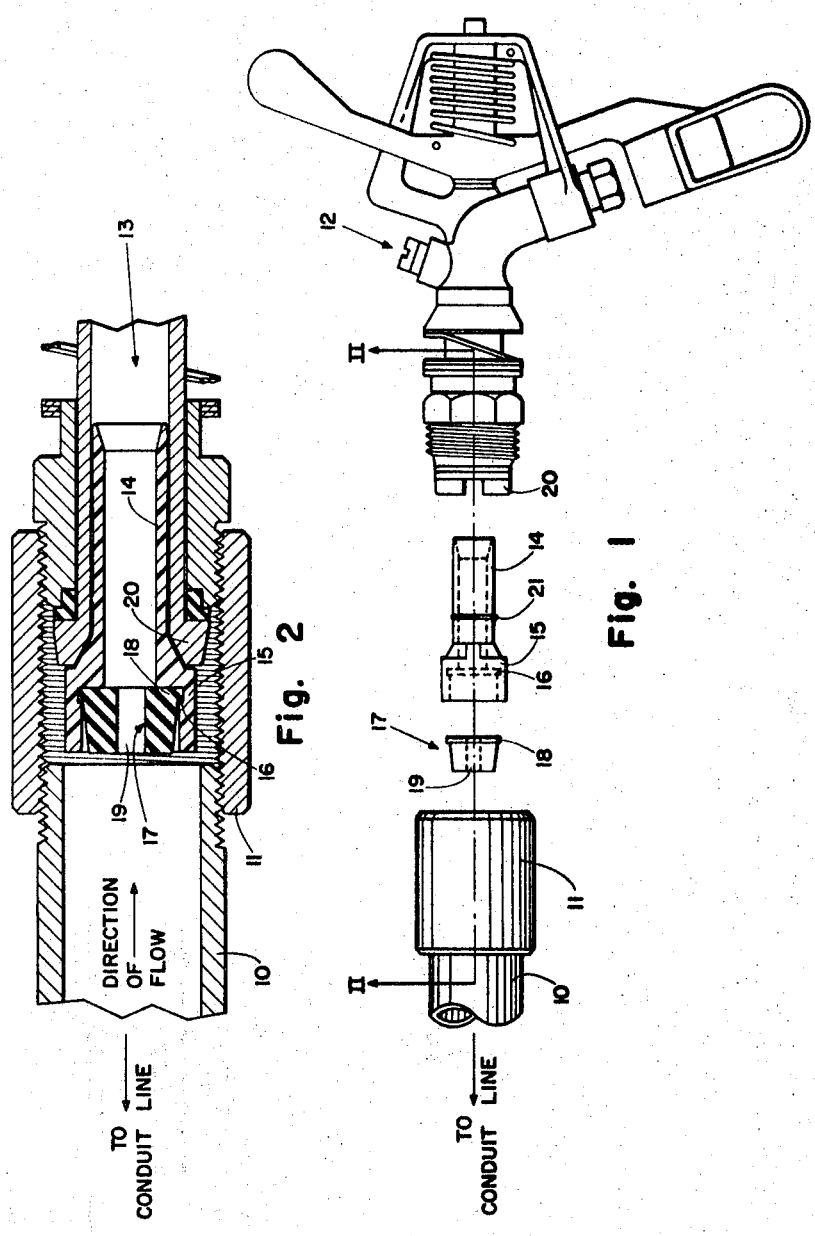

FLOW CONTROL DEVICE

Flow Control Device

The present invention relates to a flow control device and more particularly to an improved flow control device, in a self-contained capsule form, for regulating fluid flow in conduit systems.

The structures of flow control devices are generally known in the fluid control art. An essential working part of such devices is a control element which is inexpensive to manufacture and simple to use. A known form of such a control element is a restorably deformable cylinder having a longitudinal perforation therethrough along the cylinder axis. This control element is commonly located in some portion of a conduit or valve housing, through which liquid flows, and in which the rate of flow is to be controlled. Used in this way, the control element effectively becomes a component of the conduit or valve housing.

Either the conduit, the valve housing, or the control element is adapted so that all of the liquid flows through the perforation. The prior art shows that the cylindrical control element has an outside diameter which is smaller than the inside diameter of the conduit thus allowing the static head pressure of the liquid to act upon its outside surface. A pressure differential between the static head pressure and the lower velocity head pressure of the fluid passing through the perforation causes the wall of the control element to flex inwardly thereby constricting the perforation. In this manner the cross-sectional area of the perforation varies inversely with the pressure differential to give a regulatory effect to the liquid flow and makes the flow substantially constant over a range of static head pressures.

An example of a structure employing this principle of fluid control may be seen in Canadian Pat. No. 557,367, issued on 13 May, 1958 to Thomas R. Smith. Other examples may be seen in U.S. Pat. No. 2,764,183 issued on 25 September, 1956 to Carroll T. Gollehon and in U.S. Pat. No. 2,781,058, issued on 12 February, 1957, to J. D. Warhus.

The Smith patent discloses the use of a cylindrical control element combined with an electrically operated remote control valve. The valve structure functions as a casing member or housing for the cylindrical control element.

The Gollehon patent applies the principle of the cylindrical control element to a separate control device which may be inserted serially in a conduit system by first opening a conduit and then connecting the control device between the open conduit ends. In contrast with the Smith patent, the teachings of Gollehon lead in the direction of a flow control device which is distinctly separate and external to the conduit with which it is joined.

As a practical matter it would appear that the Gollehon structure may suffer from certain mechanical problems. For example, the housing of the flow control device must be compatible in strength with the structure of the conduit system if mechanical conduit failures are to be avoided. In order to overcome such a difficulty a sturdy casing member or housing for the control element is required. This, however, will increase the manufacturing cost of the flow control device and may thus prohibit its use in some applications.

The teachings of Warhus are similar to that of Gollehon in that the flow control device of Warhus requires a casing member or housing which is serially connected to the conduit with which it is to be used. Because of the similarity in structure, it is anticipated that any mechanical failure problems in the Gollehon flow control device would also likely occur in the Warhus flow control device.

The patents to Smith, Gollehon, and Warhus notwithstanding a problem continues to exist in water sprinkler systems used in agricultural applications. The problem encountered is wastage of water under high pressure water conditions where there is a spray overlap between adjacent sprinklers and of insufficient crop watering under low water pressure conditions where adjacent sprays of water do not extend sufficiently far to meet. The teachings of Smith, Gollehon and Warhus indicate a solution to the problem by showing a structure which would provide a substantially constant flow of water under varying water pressure conditions. But, the mechanical complexity and expense of altering an extant agricultural water sprinkler system to use these known techniques may preclude their use. For example, since the teachings of the prior art include external flow control devices which are serially added to a conduit system, if the conduit system is rigid and fixed in size or is not readily expandable, portions of the conduit must be excised and replaced with flow control devices of a similar length, a time consuming and expensive operation. Alternatively, if the teachings of Smith are followed and either the sprinklers or the conduit are adapted to retain control elements, such a modification would likewise be time consuming and expensive.

It is, accordingly, one object of the invention disclosed herein to provide a flow control device which may be added to a conduit system without changing the system's external dimensions.

It is a further object of this invention to provide a flow control device which does not require a housing that is compatible in strength with the conduit system.

A still furthr object of this invention is to provide a flow control device which may be inserted within a sprinklerhead or a conduit without adaptation thereof.

The anticipated difficulties with the prior art flow control devices may be overcome, and the objectives of the present invention may be attained by recourse to the invention herein disclosed which is a flow control device that is insertable within a conduit conducting a fluid under a static head pressure. The device includes an insert casing comprising a hollow tube that is insertable within the conduit and is adapted to closely fit therein. Situated within the tube is an orifice valve that comprises a resilient body which is deformably responsive to an applied pressure. The body is smaller than the inside diameter of the tube and has a longitudinal perforation therethrough. A sealing and support means is annularly interposed between the valve and the tube. The said means is adapted to keep the valve substantially spaced throughout its periphery from the internal wall of the tube and to confine the fluid flow through the perforation while exposing a portion of the valve to the static head pressure, whereby an increase in the pressure will flexibly deform the valve and constrict the perforation to maintain a substantially constant rate of fluid flow through the conduit.

In drawings which illustrate an embodiment of the invention,

FIG. 1 is an exploded side elevation view of a sprinkler-head, a flow control device which is insertable therein and a stand pipe to which the sprinkler-head may be threaded, and FIG. 2 is a partial sectional view of the components in FIG. 1, in assembled form, taken along the section line II—II.

A stand pipe 10 is a vertical conduit member which is connected to, and receives water under a static head pressure directly from a conduit line that is not shown in the figures. Attached to the free end of the stand pipe 10 is a threaded coupling 11 which is used to make a connection to a sprinklerhead 12. Between the pipe 10 and the sprinkler-head 12, a flow control device 13 is employed to maintain a substantially constant rate of water flow irrespective of normal pressure variations in the water source.

a sectional view of a flow control device 13 in a self-contained capsule form may be seen in FIG. 2. The device 13 comprises in part an insert casing shown as a hollow tube 14 having a belled end 15 with an annular recess 16 to receive and retain a control element. The recess 16 is coaxial with the casing and is located on the inner periphery of the belled end 15 next to its junction with the tube 14. The control element is shown as an orifice valve 17, having a flanged end 18, and includes a longitudinal perforation 19 along its axis thereby creating an annular structure. Since the valve 17 is resilient, the flanged end 18 may be squeezed into the belled end 15 to engage the annular recess 16 and to form a liquid-tight seal at that union. It may be seen that the flanged end 18 thus performs two functions; it supports the valve 17 coaxially within the belled end 15 and its forms a seal between the valve 17 and the inner surface of the balled end 15 to confine the flow of water through the perforation 19.

To assemble the flow control device 13, the orifice valve 17 is inserted flanged end 18 first into the belled end 15 to allow the flanged end 18 to engage with and lock into the annular recess 16. The assembled flow control device 13 is then inserted, orifice valve 17 last, into a bearing nipple 20 of the sprinkler head 12.

The diameter of the tube 14 is sized to fit snuggly into a bearing nipple 20 to prevent the flow control device 13 from dropping down into the stand pipe 10. This is accomplished by having a slightly raised portion 21 on the tube to provide a friction fit within the bearing nipple 20. Alternatively, all or part of the tube 14 may be slightly flared toward the belled end 15 to provide a tight frictional fit when the tube 14 is inserted within the bearing nipple 20. If required, the position of the flow control device 13 may even be further stabilized by the application of a liquid adhesive to the tube 14 before it is inserted into the bearing nipple 20.

For the flow control device 13 to function properly, the orifice valve 17 is molded from an elastomeric material such as natural rubber, Buna-B or a synthetic material such as neoprene. Because of the long life, and resilient characteristics of neoprene, it has been selected as a preferred material.

The tube 14 is conveniently molded or fabricated from corrosion resistant thermoplastic materials such as polyethylene, vinyl chloride or nylon, nylon being a preferred material.

It will be noted from the sectional view of the orifice valve 17, that it is in the general shape of a truncated cone, the truncated upstream end diameter being smaller than the diameter of the downstream flanged end. The purpose of this conformation is to substantially space the valve 17 about its periphery from the inner surface of the end 15. This will permit the static head pressure of the water to act on the outside surface of the upstream portion of the valve 17. A pressure differential between the static head pressure and the lower velocity head pressure of the water passing through the perforation 19 causes the resilient annular wall of the valve 17 to be deformed inwardly thereby constricting the perforation 19. Since the cross-sectional area of the perforation 19 varies inversely with the pressure differential, the result is to even out flow rate irregularities due to varying static head pressures, and to maintain substantially constant the rate of water flow from the stand pipe 10 through the sprinkler-head 12.

The embodiments of the invention in which an exclusive property or privilege is claimed are defined as follows:

1. A flow control device for insertion within a conduit conducting a fluid under a static head pressure, comprising in combination:

an insert casing comprising a hollow tube insertable within the conduit and adapted to closely fit therein;

said insert casing including on its inner periphery an annular recess that is co-axial with the casing;

an orifice valve, situated within the tube, comprising a resilient body deformably responsive to an applied pressure, the body being smaller than the inside diameter of the tube and having a longitudinal perforation therethrough;

sealing and support means annularly interposed between the valve and the tube to substantially space the valve throughout its periphery from the internal wall of the tube and to confine the fluid flow through the perforation while exposing a portion of the valve to the static head pressure, whereby an increase in the pressure will flexibly deform the valve and constrict the perforation to maintain a substantially constant rate of fluid flow through the conduit; and said sealing and support means comprising a flanged end on the orifice valve shaped to mate with the annular recess and to form a seal thereat.

2. A flow control device as defined in claim 1 wherein:

the insert casing is fabricated from a thermoplastic corrosion resistant material and the orifice valve is fabricated from an elastomeric material.

3. A flow control device insertable within a sprinkler-head connected to a source of water under a static head pressure, comprising in combination:

an insert casing comprising a thermoplastic corrosion resistant hollow tube with a belled end, having on its inner periphery at the tube and belled end junction an annular recess coaxial with the casing, the tube portion being insertable within the sprinkler-head and adapted to closely fit therein;

an orifice valve, situated coaxially within the belled end, comprising an elastomeric body deformably responsive to an applied pressure, the body being in the form of a truncated cone having a flanged end opposite the truncated end, the flanged end being adapted to engage the annular recess to form a seal thereat and the valve having a coaxially located longitudinal perforation therethrough, whereby an increase in the water pressure will flexibly deform the valve and constrict the perforation to maintain a substantially constant rate of water flow through the sprinkler-head.

4. A flow control device for insertion within a conduit assembly having first and second conduit means conducting a fluid under a static head pressure, said flow control device comprising in combination:
an insert casing comprising a hollow tube, said tube including:
an axially elongate portion at one end being insertable axially within the first conduit means to effect a frictional gripping connection therewith, and
a belled connector portion at the other end, said connector portion including shoulder means engageable with said first conduit means, and recess means extending generally radially relative to the axis of the conduit assembly;
an orifice valve comprising a resilient body deformably responsive to an applied pressure, the body having:
a longitudinal perforation therethrough;
generally radially extending flange means at one end of said body, said flange means being removably installed within said recess means, and
outer wall means arranged to be exposed to a static head pressure of fluid conducted within said conduit assembly such that an increase in pressure induces flexible deformation of said body to constrict the perforation in a manner maintaining a substantially constant rate of fluid flow.

5. A flow control device as recited in claim 4 wherein the outer wall means of said body is tapered inwardly in a direction away from said flange means to facilitate the removal of a worn valve and the installation of a replacement valve.

* * * * *